(12) United States Patent
Liu et al.

(10) Patent No.: US 9,239,682 B2
(45) Date of Patent: Jan. 19, 2016

(54) I/O HINT FRAMEWORK FOR SERVER FLASH CACHE

(71) Applicant: VMware, Inc., Palo Alto, CA (US)

(72) Inventors: Deng Liu, Mountain View, CA (US); Thomas A. Phelan, San Francisco, CA (US); Li Zhou, Campbell, CA (US); Ramkumar Vadivelu, San Jose, CA (US); Sandeep Uttamchandani, Cupertino, CA (US)

(73) Assignee: VMware, Inc., Palo Alto, CA (US)

( * ) Notice: Subject to any disclaimer, the term of this patent is extended or adjusted under 35 U.S.C. 154(b) by 208 days.

(21) Appl. No.: 13/779,260

(22) Filed: Feb. 27, 2013

(65) Prior Publication Data
US 2014/0244898 A1 Aug. 28, 2014

(51) Int. Cl.
*G06F 3/06* (2006.01)
*G06F 12/12* (2006.01)

(52) U.S. Cl.
CPC ............ *G06F 3/0611* (2013.01); *G06F 3/0659* (2013.01); *G06F 3/0689* (2013.01); *G06F 12/126* (2013.01); *G06F 2212/222* (2013.01); *G06F 2212/6026* (2013.01); *G06F 2212/6028* (2013.01)

(58) Field of Classification Search
None
See application file for complete search history.

(56) References Cited

U.S. PATENT DOCUMENTS

| | | | |
|---|---|---|---|
| 6,839,740 B1 * | 1/2005 | Kiselev | 709/214 |
| 7,340,726 B1 * | 3/2008 | Chelf et al. | 717/126 |
| 7,529,867 B2 | 5/2009 | McCrory | |
| 8,819,374 B1 * | 8/2014 | Don et al. | 711/165 |
| 2001/0039579 A1 * | 11/2001 | Trcka et al. | 709/224 |
| 2006/0251087 A1 * | 11/2006 | Ng et al. | 370/401 |
| 2007/0256055 A1 * | 11/2007 | Herscu | 717/115 |
| 2009/0300302 A1 * | 12/2009 | Vaghani | 711/162 |
| 2011/0066808 A1 * | 3/2011 | Flynn et al. | 711/118 |
| 2014/0052892 A1 * | 2/2014 | Klein et al. | 711/103 |

OTHER PUBLICATIONS

Windows Server Device Management and Installation Troubleshooting Guide—"The Device has an Unrecognized Device ID". Updated Aug. 31, 2007.*
Mesnier, Michael and et al. "Differentiated Storage Services". Intel Labs. Oct. 23-26, 2011.*
NetApp, Inc. "Proposal—LBA Access Hints". Last revised Feb. 15, 2012.*
Mesnier, Michael et al., "Differentiated Storage Devices," SOSP '11, Oct. 23-26, 2011, Cascais, Portugal, pp. 57-70.
SBC-3—LBA Access Hints, T10/11-436 r5, NetApp and Western Digital, Feb. 15, 2012, 33 pages.
Wong, Theodore M. et al., "My Cache or Yours? Making Storage More Exclusive," USENIX Annual Technical Conference, pp. 161-175, Jun. 10-15, 2002, Monterey, CA.

* cited by examiner

*Primary Examiner* — Christian P Chace
*Assistant Examiner* — Jane Wei (57) ABSTRACT

An I/O hint framework is provided. In one embodiment, a computer system can receive an I/O command originating from a virtual machine (VM), where the I/O command identifies a data block of a virtual disk. The computer system can further extract hint metadata from the I/O command, where the hint metadata includes one or more characteristics of the data block that are relevant for determining how to cache the data block in a flash storage-based cache. The computer system can then make the hint metadata available to a caching module configured to manage the flash storage-based cache.

22 Claims, 6 Drawing Sheets

SCSI_CMD_VFLASH_READ10

| BIT → ↓ BYTE | 7 | 6 | 5 | 4 | 3 | 2 | 1 | 0 |
|---|---|---|---|---|---|---|---|---|
| 0 | OPERATION CODE = C8H ||||||||
| 1 | LUN ||| DPO | FUA | RESERVED || RELADR |
| 2-5 | LBA ||||||||
| 6 | RESERVED ||||||||
| 7-8 | TRANSFER LENGTH ||||||||
| 9 | CONTROL ||||||||
| 10 | VENDOR ID ||||||||
| 11-24 | HINT PAYLOAD ||||||||

FIG. 4

SCSI_CMD_VFLASH_WRITE10

| BIT →<br>↓ BYTE | 7 | 6 | 5 | 4 | 3 | 2 | 1 | 0 |
|---|---|---|---|---|---|---|---|---|
| 0 | \multicolumn{8}{c}{OPERATION CODE = CAH} |
| 1 | WPPROTECT | | | DPO | FUA | RESRV | FUA_NV | OBS |
| 2-5 | LBA |||||||| 
| 6 | RESERVED | | | | GROUP NUMBER ||||
| 7-8 | TRANSFER LENGTH ||||||||
| 9 | CONTROL ||||||||
| 10 | VENDOR ID ||||||||
| 11-24 | HINT PAYLOAD ||||||||

I/O HINT FRAMEWORK FOR SERVER FLASH CACHE

BACKGROUND

Server Flash Cache (SFC) is a technology that allows host systems to leverage flash storage to accelerate virtual machine (VM) I/O operations. Generally speaking, an SFC-enabled host system includes a host-side flash storage device (e.g., a solid state disk (SSD), a PCIe flash card, etc.) and a hypervisor-resident caching module. The caching module intercepts I/O requests from VMs running on the host system and caches, in a portion of the host-side flash storage device referred to as a "flash cache," data associated with the I/O requests that the host system reads from, or writes to, a backend storage array (e.g., a hard disk-based array). In addition, upon intercepting a read request, the caching module determines whether the data associated with the read request is already available in the flash cache. If so, the caching module services the read request from the flash cache rather than the backend storage array. Since the I/O latency for flash storage access is typically several orders of magnitude less than the I/O latency for hard disk access, this caching mechanism can significantly improve VM I/O performance.

In certain instances, an application running within a VM may have access to contextual information regarding the I/O requests it issues that can assist the caching module in managing the flash cache. For example, the application may know that it will issue a read request for a particular data block several times over a short timespan, which suggests that the caching module should keep that data block in the flash cache to service the multiple requests. As another example, the application may know that it will issue a read request for a particular data block only once, which suggests that the caching module should deprioritize that data block or avoid caching it altogether. Unfortunately, with current SFC implementations, there is no way to communicate such contextual information (referred to as "I/O hints" or "hints") from the VM-level application to the hypervisor-level caching module. Thus, the caching module can only make caching decisions based on the observed I/O requests themselves, which may result in sub-optimal flash cache usage/management.

SUMMARY

An I/O hint framework is provided. In one embodiment, a computer system can receive an I/O command originating from a VM, where the I/O command identifies a data block of a virtual disk. The computer system can further extract hint metadata from the I/O command, where the hint metadata includes one or more characteristics of the data block that are relevant for determining how to cache the data block in a flash storage-based cache. The computer system can then make the hint metadata available to a caching module configured to manage the flash storage-based cache.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

Particular embodiments provide a framework for passing I/O hints from a VM executing on a host system to a caching module resident in the host system's hypervisor. In one embodiment, the hypervisor can receive an I/O command originating from the VM, where the I/O command identifies a data block (e.g., a logical block address, or LBA) of a target virtual disk. In a particular embodiment, the I/O command can be a SCSI Command Descriptor Block (CDB). The hypervisor can then extract hint metadata from the I/O command that an application running within the VM (e.g., a hint collector) has embedded. The hint metadata can include characteristics of the data block that are relevant for determining how to cache the data block in a flash storage-based cache (i.e., flash cache). For example, the hint metadata can include information regarding anticipated access patterns of the data block, a desired I/O latency for accessing the data block, and so on. Upon extracting the hint metadata, the hypervisor can make the hint metadata available to the caching module to inform the caching process.

With the I/O hint framework above, the caching module can employ more sophisticated caching algorithms than otherwise possible by observing I/O requests alone. For example, the caching module can use the I/O hints to implement data de-duplication, encryption, cache pollution prevention, and more. As a result, the caching module can better optimize its management of the flash cache.

In certain embodiments, the caching module can be a modular hypervisor component that one of a number of "third-party" vendors (i.e., vendors that are distinct from the hypervisor vendor) implements. In these embodiments, the I/O hint framework can support vendor-defined hints—in other words, I/O hints that are designed by, and proprietary to, a particular third-party vendor. When the I/O hint framework detects a vendor-defined hint that is proprietary to, e.g., a third-party vendor A, the I/O hint framework can ensure that the vendor-defined hint is routed solely to the caching module (s) implemented by vendor A (and not to any other third-party caching modules).

In addition to (or in lieu of) vendor-defined hints, the I/O hint framework can also support generic, or vendor-neutral, hints. These generic hints can conform to a published format and can be useable by any caching module implementation (created by any vendor). In a particular embodiment, the I/O hint framework can distinguish between vendor-defined hints and generic hints by embedding these hints in distinct SCSI CDBs, which are described in detail below.

Figure 1:
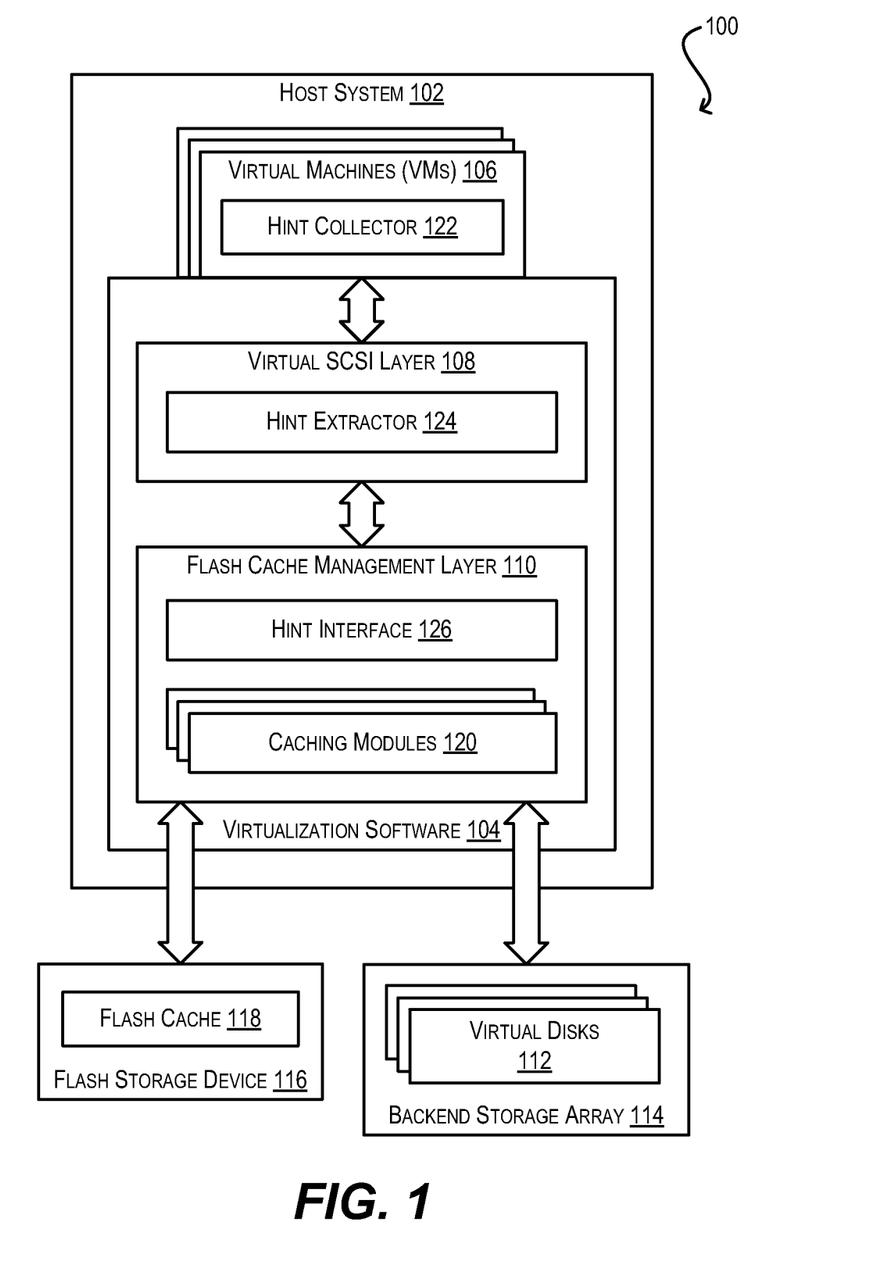
FIG. 1 depicts a block diagram of a system environment that supports I/O hint passing according to one embodiment.

FIG. 1 depicts a system environment 100 that supports I/O hint passing according to an embodiment. System environment 100 includes a host system 102 that executes virtualization software 104. Virtualization software 104 (also known as a hypervisor) is a software layer that provides an environment in which one or more VMs 106 can run. In one embodiment, virtualization software 104 can interact directly with the hardware platform of host system 102 without an intervening host operating system. In this embodiment, virtualization software 104 can include a kernel (not shown) that manages VM use of the various hardware devices of host system 102. In an alternative embodiment, virtualization software 104 can be part of a "hosted" configuration in which virtualization software 104 runs on top of a host operating system (not shown). In this embodiment, virtualization software 104 can rely on the host operating system for physical resource management of hardware devices. One of ordinary skill in the art will recognize various modifications and alternatives for the design and configuration of virtualization software 104.

As shown, virtualization software 104 includes a virtual SCSI layer 108 and a flash cache management layer 110. Virtual SCSI layer 108 can receive I/O requests from VMs 106 in the form of virtual SCSI commands (i.e., SCSI commands directed to virtual SCSI devices corresponding to one or more virtual disks 112). Virtual SCSI layer 108 can then translate the virtual SCSI commands into a command/data format that virtualization software 104 can use to access the physical storage device(s) on which virtual disks 112 are stored (e.g., backend storage array 114).

Flash cache management layer 110 receives translated I/O requests from virtual SCSI layer 108 and is responsible for caching the I/O requests in a portion of a flash storage device 116 shown as flash cache 118. When flash cache management layer 110 detects a VM read request that is already cached in flash cache 118, flash cache management layer 110 can service the read request directly from flash storage device 116, rather than performing a roundtrip to backend storage array 114. This can significantly accelerate the I/O performance of VMs 106.

In the embodiment of FIG. 1, all (or a portion) of the caching logic that flash cache management layer 110 executes (e.g., write policies, cache eviction policies, etc.) is encapsulated in one or more caching modules 120. In certain embodiments, caching modules 120 can be modular components of virtualization software 104, such that various different third-party vendors can implement their own caching modules (with their own custom caching logic) and plug their caching modules into virtualization software 104. In situations where multiple caching modules are installed in virtualization software 104, a system administrator can designate a particular caching module as being active at a given time for managing/controlling flash cache 118.

As noted in the Background section, one limitation with existing flash cache implementations is that there is no way for VM-level applications to provide the flash cache management layer with contextual information that may be helpful when caching I/O requests. For instance, there is no mechanism for flagging a particular read request as being a high-frequency request (indicating that the data associated with the request should be prioritized in the flash cache) or a low-frequency request (indicating that the data associated with the request should be de-prioritized in the flash cache). To address this, host system 102 includes a hint collector 122 (within each VM 106), a hint extractor 124 (within virtual SCSI layer 108), and a hint interface 126 (within flash cache framework layer 110). As described in further detail below, hint collector 122, hint extractor 124, and hint interface 126 can interoperate to enable I/O hint passing from VMs 106 to caching modules 120, thereby allow caching modules 120 to manage flash cache 118 in an application-advised manner.

Figure 2:
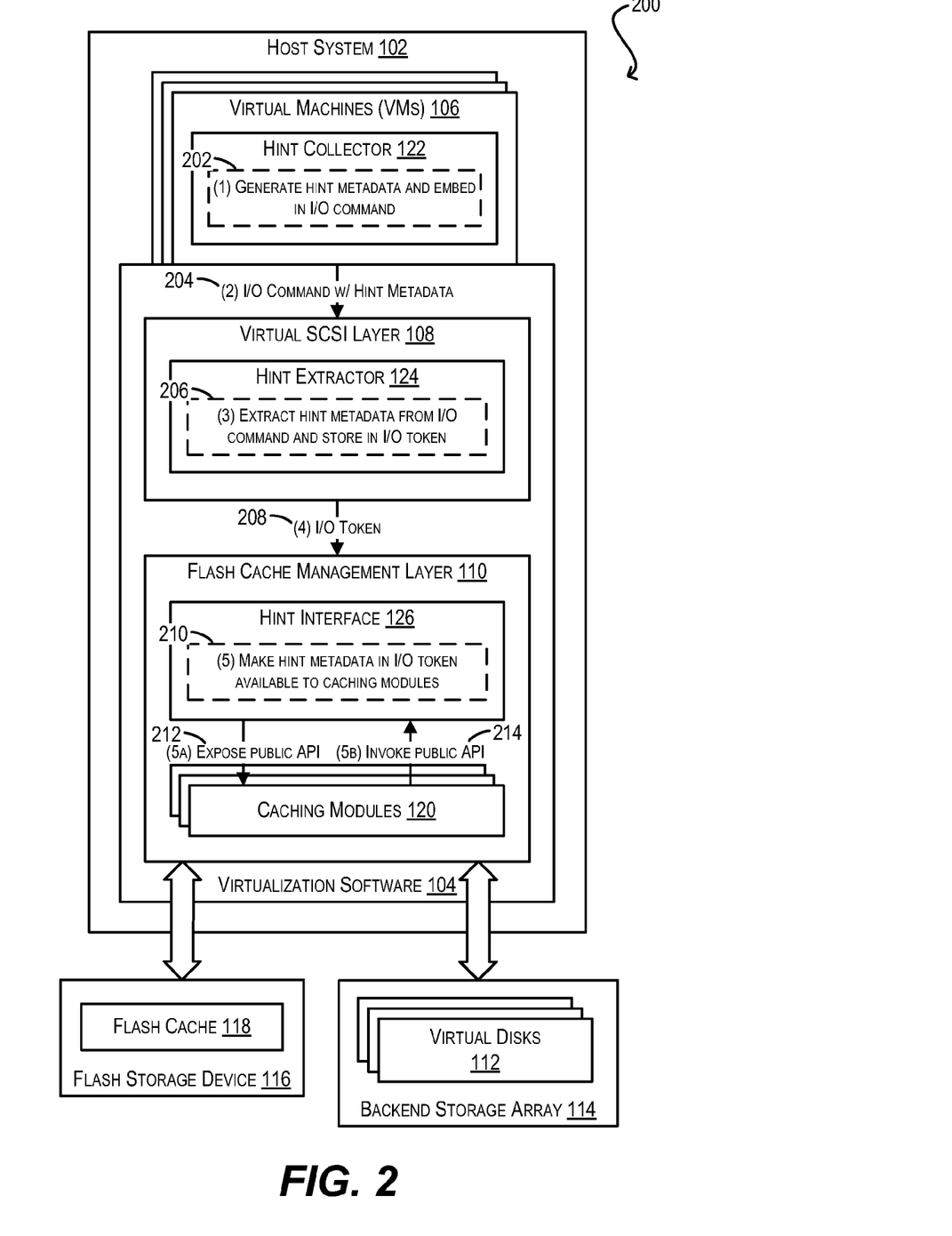
FIG. 2 depicts a flow within the system environment of FIG. 1 for enabling I/O hint passing according to one embodiment.

FIG. 2 depicts a flow 200 within system environment 100 that explains, at a high level, how hint components 122-126 can enable I/O hint passing according to an embodiment. At step (1) of flow 200 (reference numeral 202), hint collector 122 of VM 106 can generate hint metadata pertaining to a particular read or write request and embed the hint metadata into an I/O command for the request. In one embodiment, some or all of hint collector 122 can be part of a user-level application running within VM 106, such as a database application, an anti-virus application, or the like. In other embodiments, some or all of hint collector 122 can be part of the guest OS software stack running within VM 106, such as a guest OS device driver.

The hint metadata that hint collector 122 generates at step (1) can include, e.g., characteristics of the data block that may be relevant to caching module 120 for determining how to cache the I/O request in flash cache 118. For example, the hint metadata can include information regarding anticipated access patterns for the data block (e.g., high frequency access, low frequency access, etc.), desired I/O latency for accessing the data block (e.g., low latency required, low latency not required, etc.), I/O sequentiality of the data block (e.g., sequential, random, etc.), and so on.

At step (2) (reference numeral 204), VM 106 can pass the I/O command with the embedded hint metadata to virtual SCSI layer 108. In one set of embodiments, the I/O command can be a SCSI CDB that identifies a LBA of a target virtual disk 112. In these embodiments, the hint metadata can be embedded in certain predetermined fields of the SCSI CDB. In a particular embodiment, the particular type of SCSI CDB that VM 106 transmits at step (2) can differ based on whether the hint metadata comprises vendor-defined hints or generic hints. This distinction is discussed with respect to FIGS. 3 and 6 below.

At step (3) (reference numeral 206), hint extractor 124 of virtual SCSI layer 108 can extract the hint metadata from the I/O command. Hint extractor 124 can then store the extracted hint metadata in an internal data buffer (referred to as an "I/O token" or "data token"), and pass the I/O token to flash cache management layer 110 (step (4), reference numeral 208).

Finally, at step (5) (reference numeral 210), hint interface 126 of flash cache management layer 110 can receive the I/O token and make the hint metadata in the I/O token available to the currently active caching module 120. In some embodiments, the structure of the I/O token can be opaque (i.e., not visible) to caching module 120. This prevents third-party caching module implementations from relying on a particular token data format or structure that the vendor of virtualization software 104 may change over time. In these embodiments, as part of step (5), hint interface 126 can expose a public application programming interface (API) to caching module 120 for retrieving the hint metadata from the I/O token (step (5a), reference numeral 212). Caching module 120 can invoke the public API to retrieve the hint metadata (step (5b), reference numeral 214) and thereafter process the retrieved hint metadata as appropriate for facilitating the caching of the I/O request in flash cache 118.

As noted above, the I/O hint framework shown in FIGS. 1 and 2 can support both vendor-defined hints and generic hints. Vendor-defined hints are hints that are designed by, and proprietary to, a particular third-party vendor that is distinct from the vendor of virtualization software 104. Generic hints are standard, predefined hints that may be used by any vendor. In the vendor-defined hint scenario, hint collector 122 can embed the hints in certain byte fields of a custom SCSI write or read CDB. The remaining hint components can then extract the hint payload from the custom SCSI CDB and make the hint payload available to the currently active caching module. In this scenario, the I/O hint framework can ensure that vendor-defined hints are routed only to caching module (s) implemented by the same third-party vendor that designed the hints (thereby preventing proprietary hint metadata from being revealed to other third-party vendors). In the generic hint scenario, hint collector 122 can embed the hints in the group number field of a standard T10 SCSI write or read CDB. The remaining hint components can then extract the hint payload from the standard SCSI CDB and make the hint payload available to the currently active caching module.

Figure 3:
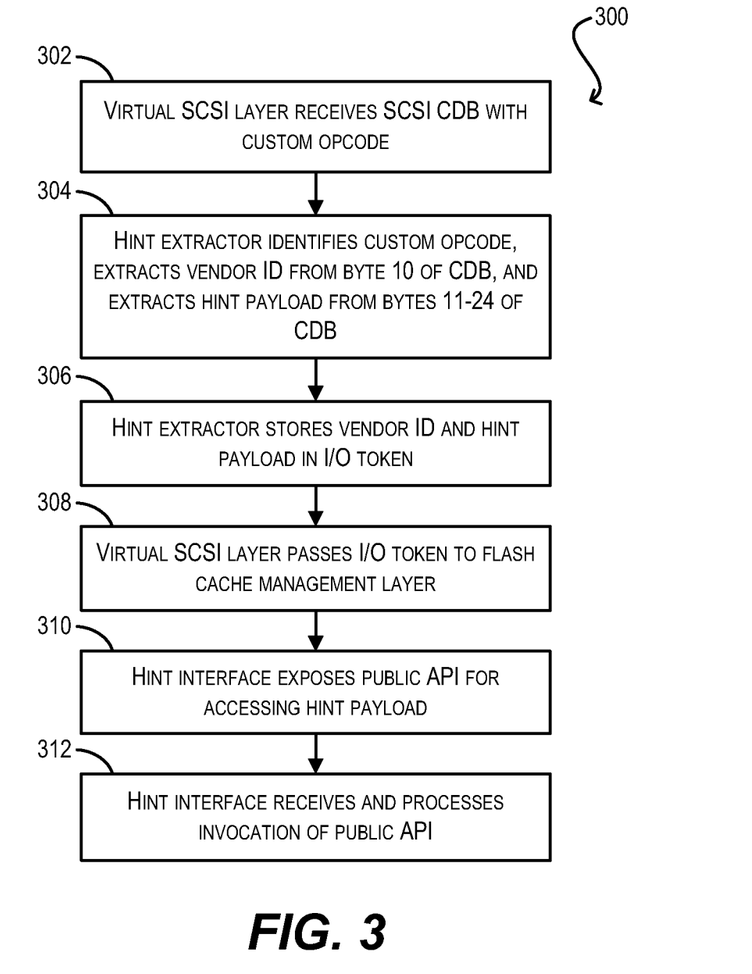
FIG. 3 depicts a flowchart for passing vendor-defined I/O hints according to one embodiment.

FIG. 3 depicts a process 300 that can be performed by the hint components of virtualization software 104 for passing vendor-defined hints according to an embodiment. Process 300 is similar to high level flow 200 of FIG. 2, but includes aspects that are specific to the vendor-defined hint scenario.

Figure 4:
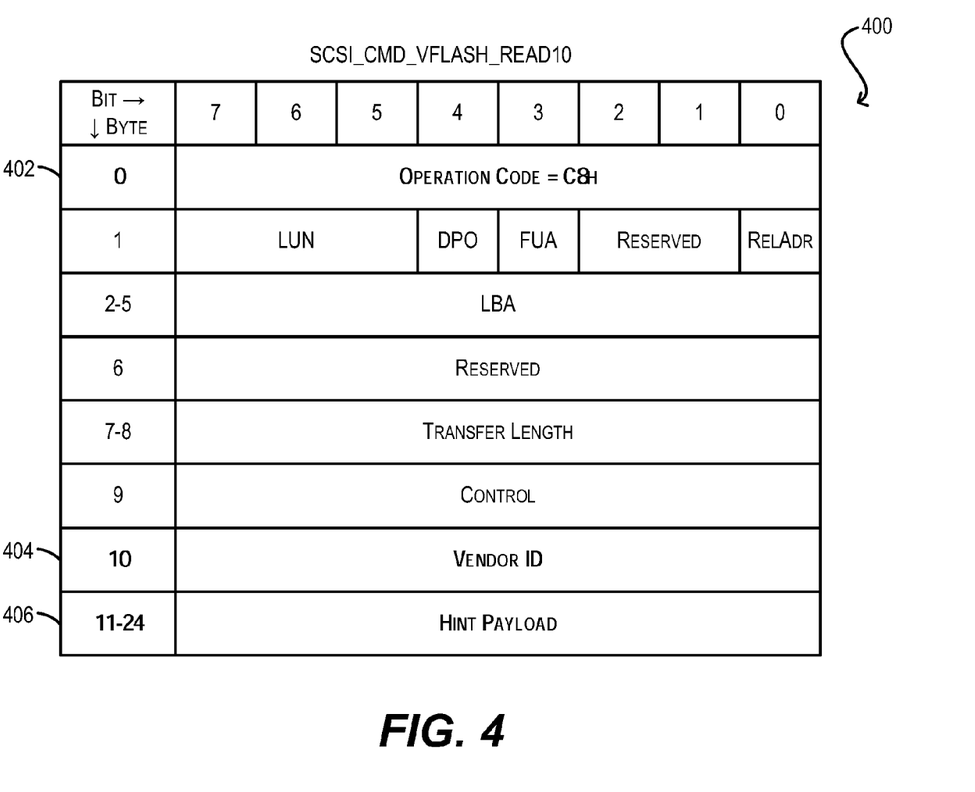
FIG. 4 depicts the format of an exemplary custom SCSI READ command according to one embodiment.

At block 302, virtual SCSI layer 108 can receive a SCSI CDB from VM 106 that corresponds to an I/O request, where the SCSI CDB is a custom CDB (in other words, includes a custom opcode that is not part of the SCSI T10 standard). In one embodiment, the custom SCSI CDB can be a read command that is a variation of the standard SCSI Read10 CDB. An exemplary structure of such a custom SCSI Read10 CDB 400 is shown in FIG. 4 (named "SCSI_CMD_V-FLASH_READ10"). The structure of SCSI_CMD_V-FLASH_READ10 is similar to the standard Read10 CDB, but includes the custom opcode "C8h" at byte 0 (reference numeral 402), a vendor ID identifying the third-party vendor that has defined the hints at byte 10 (reference numeral 404), and a hint payload at bytes 11-24 (reference numeral 406).

Figure 5:
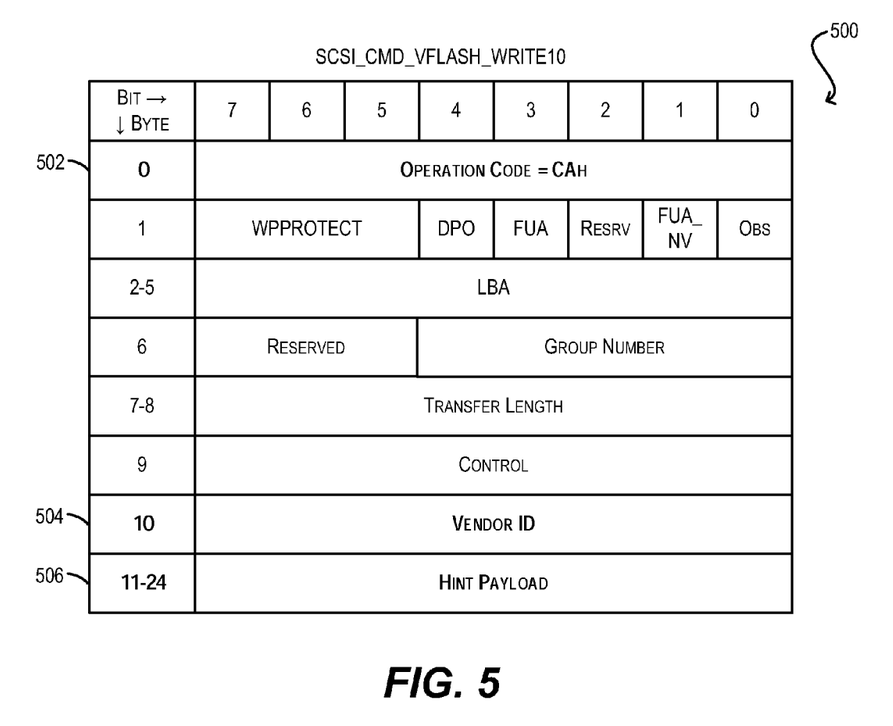
FIG. 5 depicts the format of an exemplary custom SCSI WRITE command according to one embodiment.

In another embodiment, the custom SCSI CDB can be a write command that is a variation of the standard SCSI Write10 CDB. An exemplary structure of such a custom SCSI Write10 CDB 500 is shown in FIG. 5 (named "SCSI_CMD_VFLASH_WRITE10"). The structure of SCSI_CMD_V-FLASH_WRITE10 is similar to the standard Write10 CDB, but includes the custom opcode "CAh" at byte 0 (reference numeral 502), a vendor ID at byte 10 (reference numeral 504), and a hint payload at bytes 11-24 (reference numeral 506).

Returning to FIG. 3, at block 304, hint extractor 124 of virtual SCSI layer 108 can identify the SCSI CDB as being a custom CDB that is used to pass vendor-defined hints (via, e.g., the custom opcode "C8h" or "CAh"), and can extract the vendor ID from byte 10 of the CDB and the hint payload from bytes 11-24 of the CDB. Note that hint extractor 124 does not perform any processing of the hint payload, since the functions of the hints are known only to the third-party creator.

At block 306, hint extractor 124 can store the vendor ID and hint payload in an I/O token. The remaining steps of process 300 are similar to flow 200 of FIG. 2. For example, at block 308, virtual SCSI layer 108 can pass the I/O token to flash cache management layer 110. Upon receiving the I/O token, hint interface 126 of flash cache management layer 110 can make the hint metadata (e.g., the vendor ID and hint payload) in the I/O token available to the currently active caching module 120 via a public API (block 310). Caching module 120 can then invoke the public API to access the hint metadata (block 312). In a particular embodiment, as part of processing the invocation of the public API, hint interface 126 can ensure that the vendor ID of the calling caching module matches the vendor ID included in the hint metadata. If the vendor IDs do not match, this indicates that the hint metadata is intended for a different caching module (created by a different third-party vendor). In this case, hint interface 126 can throw an exception or otherwise prevent the calling caching module from accessing the hint payload.

Figure 6:
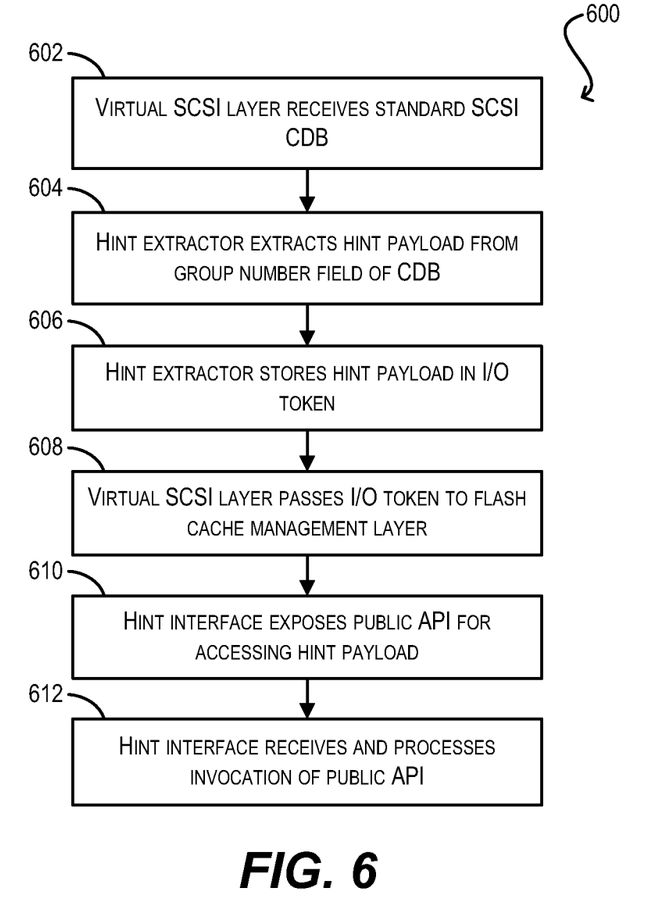
FIG. 6 depicts a flowchart for passing generic I/O hints according to one embodiment.

FIG. 6 depicts a process 600 that can be performed by the hint components of virtualization software 104 for passing generic hints according to an embodiment. Process 600 is similar to high level flow 200 of FIG. 2, but includes aspects that are specific to the generic hint scenario.

At block 602, virtual SCSI layer 108 can receive a SCSI CDB from VM 106 that corresponds to an I/O request, where the SCSI CDB is a standard T10 SCSI CDB. In one embodiment, the standard SCSI CDB can be a read command, such as the SCSI Read10 CDB. In another embodiment, the standard SCSI CDB can be a write command, such as the SCSI Write10 CDB.

At block 604, hint extractor 124 can extract a generic hint payload that hint collector 122 has embedded in the group number field of the standard SCSI CDB. In a particular embodiment, the generic hint payload can be pre-classified into three different types of hints: (1) a hint pertaining to I/O sequentiality of the LBA identified in the CDB, (2) a hint pertaining to future access frequency of the LBA identified in the CDB, and (3) a hint pertaining to desired I/O latency for the LBA identified in the CDB. In this embodiment, bits 0-1 of the group number field can correspond to I/O sequentiality, bits 2-3 of the group number field can correspond to future access frequency, and bit 4 can correspond to I/O latency. The following tables illustrate exemplary bit values (in hex notation) and associated meanings for each of these three types of hints:

TABLE 1

I/O Sequentiality

| Bit Value | Meaning |
| --- | --- |
| 0 h | Not specified |
| 1 h | Primarily sequential |
| 2 h | Equally sequential and random |
| 3 h | Primarily random |

TABLE 2

Future Access Frequency

| Bit Value | Meaning |
| --- | --- |
| 0 h | Not specified |
| 1 h | Low frequency |
| 2 h | Normal frequency |
| 3 h | High frequency |

TABLE 3

Desired Latency

| Bit Value | Meaning |
| --- | --- |
| 0 h | Not specified |
| 1 h | Low latency |

At block 606, hint extractor 124 can store the hint payload in an I/O token. The remaining steps of process 600 are similar to blocks 308-312 of FIG. 3. For example, at block 608, virtual SCSI layer 108 can pass the I/O token to flash cache management layer 110. Upon receiving the I/O token, hint interface 126 can make the hint metadata in the I/O token available to the currently active caching module 120 via a public API (block 610). Caching module 120 can then invoke the public API to access the hint metadata (block 612). In one embodiment, the public API that hint interface 126 exposes to access generic hints at block 610 is different from the public API that hint interface 126 exposes to access vendor-specific hints at block 310 of FIG. 3. In other embodiments, the two public APIs can be combined into a single public API.

Although processes 300 and 600 of FIGS. 3 and 6 are shown as two separate processes, in certain embodiments these processes can be combined to pass both vendor-specific hints and generic hints to caching module 120 for the same I/O request. In these situations, the vendor-defined hint payload can be carried in bytes 11-24 of the (custom) SCSI CDB, and the generic hint payload can be carried in the group number field of the same SCSI CDB. Caching module 120 can then retrieve both hint payloads via the appropriate public APIs. If there is a conflict between the vendor-defined hints and the generic hints, the caching module can include a conflict resolution mechanism for determining which hints should be honored as part of its cache processing flow.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations. The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer. Examples of a non-transitory computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The non-transitory computer readable medium can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, various virtualization operations may be wholly or partially implemented in hardware.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention (s). In general, structures and functionality presented as separate components in exemplary configurations may be implemented as a combined structure or component. Similarly, structures and functionality presented as a single component may be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for passing input/output (I/O) hints, the method comprising:
    receiving, by a hypervisor of a computer system, an I/O command originating from a virtual machine (VM), the I/O command identifying a data block of a virtual disk;
    extracting, by the hypervisor from the I/O command, hint metadata that is embedded in the I/O command, the hint metadata including one or more I/O hints that are relevant for determining how to cache the data block in a flash storage-based cache; and
    making, by the hypervisor, the hint metadata available to one of a plurality of caching modules of the hypervisor, each of the plurality of caching modules being configured to manage the flash storage-based cache,
    wherein when the I/O command comprises a first opcode indicating that the hint metadata includes one or more vendor-defined I/O hints:
        extracting the hint metadata comprises, extracting a vendor identifier and the hint metadata from one or more first fields of the I/O command, the vendor identifier identifying a vendor that has defined the one or more vendor-defined I/O hints and has implemented a vendor-specific caching module in the plurality of caching modules, the vendor-specific caching module being is configured to interpret the one or more vendor-defined I/O hints in order to determine how to cache the data block in the flash storage-based cache; and making the hint metadata available to one of the plurality of caching modules comprises making the hint metadata available solely to the vendor-specific caching module.

2. The method of claim 1 wherein the hint metadata is determined by an application running within the VM.

3. The method of claim 1 wherein
the extracted hint metadata is stored in a data token.

4. The method of claim 3 wherein the structure of the data token is not visible to the plurality of caching modules.

5. The method of claim 4 wherein
the extracted hint metadata is made available to one of the plurality of caching modules by exposing a public Application Programming Interface (API) that is callable by the caching module for retrieving the extracted hint metadata from the data token.

6. The method of claim 1 wherein the vendor identified by the vendor identifier is distinct from a vendor of the hypervisor.

7. The method of claim 1 wherein the one or more vendor-defined I/O hints are proprietary to the vendor identified by the vendor identifier, such that the one or more vendor-defined I/O hints cannot be understood by other caching modules in the plurality of caching modules that are not implemented by the vendor.

8. The method of claim 1 wherein the hint metadata includes at least three I/O hints corresponding to I/O sequentiality, future access frequency, and desired I/O latency of the data block.

9. The method of claim 1 wherein if the I/O command comprises a second opcode indicating that the hint metadata does not include any vendor-defined I/O hints:
the hint metadata is extracted from one or more second fields of the I/O command that are different from the one or more first fields; and
the hint metadata is made available any currently active caching module in the plurality of caching modules.

10. The method of claim 9 wherein the I/O command is a Small Computer System Interface (SCSI) Command Descriptor Block (CDB).

11. The method of claim 10 wherein the one or more first fields include bytes 10-24 of the SCSI CDB.

12. The method of claim 10 wherein the one or more second fields include a group number field of the SCSI CDB.

13. A non-transitory computer readable storage medium having stored thereon computer software for a hypervisor executable by a processor, the computer software embodying a method for passing I/O hints, the method comprising:
receiving, by a hypervisor of a computer system, an I/O command originating from a VM, the I/O command identifying a data block of a virtual disk;
extracting, from the I/O command, hint metadata that is embedded in the I/O command, the hint metadata including one or more I/O hints that are relevant for determining how to cache the data block in a flash storage-based cache; and
making the hint metadata available to one of a plurality of caching modules of the hypervisor, each of the plurality of caching modules being configured to manage the flash storage-based cache,
wherein when the I/O command comprises a first opcode indicating that the hint metadata includes one or more vendor-defined I/O hints:
extracting the hint metadata comprises, extracting a vendor identifier and the hint metadata from one or more first fields of the I/O command, the vendor identifier identifying a vendor that has defined the one or more vendor-defined I/O hints and has implemented a vendor-specific caching module in the plurality of caching modules, the vendor-specific caching module being is configured to interpret the one or more vendor-defined I/O hints in order to determine how to cache the data block in the flash storage-based cache; and
making the hint metadata available to one of the plurality of caching modules comprises making the hint metadata available solely to the vendor-specific caching module.

14. The non-transitory computer readable storage medium of claim 13 wherein if the I/O command comprises a second opcode indicating that the hint metadata does not include any vendor-defined I/O hints:
the hint metadata is extracted from one or more second fields of the I/O command that are different from the one or more first fields; and
the hint metadata is made available to any currently active caching module in the plurality of caching modules.

15. The non-transitory computer readable storage medium of claim 14 wherein the I/O command is a Small Computer System Interface (SCSI) Command Descriptor Block (CDB).

16. The non-transitory computer readable storage medium of claim 15 wherein the one or more first fields include bytes 10-24 of the SCSI CDB.

17. The non-transitory computer readable storage medium of claim 15 wherein the one or more second fields include a group number field of the SCSI CDB.

18. A system comprising:
a flash storage device configured to store a flash cache; and
a hypervisor configured to:
receive an I/O command originating from a VM, the I/O command identifying a data block of a virtual disk;
extract, from the I/O command, hint metadata that is embedded in the I/O command, the hint metadata including one or more I/O hints that are relevant for determining how to cache the data block in a flash storage-based cache; and
make the hint metadata available to one of a plurality of caching modules of the hypervisor, each of the plurality of caching modules being configured to manage the flash storage-based cache,
wherein when the I/O command comprises a first opcode indicating that the hint metadata includes one or more vendor-defined I/O hints:
extracting the hint metadata comprises, extracting a vendor identifier and the hint metadata from one or more first fields of the I/O command, the vendor identifier identifying a vendor that has defined the one or more vendor-defined I/O hints and has implemented a vendor-specific caching module in the plurality of caching modules, the vendor-specific caching module being is configured to interpret the one or more vendor-defined I/O hints in order to determine how to cache the data block in the flash storage-based cache; and
making the hint metadata available to one of the plurality of caching modules comprises making the hint metadata available solely to the vendor-specific caching module.

19. The system of claim 18 wherein if the I/O command comprises a second opcode indicating that the hint metadata does not include any vendor-defined I/O hints:

the hint metadata is extracted from one or more second fields of the I/O command that are different from the one or more first fields; and     the hint metadata is made available to any currently active caching module in the plurality of caching modules.

20. The system of claim 19 wherein the I/O command is a Small Computer System Interface (SCSI) Command Descriptor Block (CDB).

21. The system of claim 20 wherein the one or more first fields include bytes 10-24 of the SCSI CDB.

22. The system of claim 20 wherein the one or more second fields include a group number field of the SCSI CDB.

\* \* \* \* \*